(12) United States Patent
Higashiyama et al.

(10) Patent No.: US 6,888,547 B2
(45) Date of Patent: May 3, 2005

(54) THREE-DIMENSIONAL IMAGE PROCESSING METHOD AND APPARATUS, READABLE STORAGE MEDIUM STORING THREE-DIMENSIONAL IMAGE PROCESSING PROGRAM AND VIDEO GAME SYSTEM

(75) Inventors: Makoto Higashiyama, Sakurai (JP); Tatsuya Shinkai, Suita (JP); Kentaro Nagayama, Osaka (JP)

(73) Assignee: Konami Corporation, Tokyo (JP)

( * ) Notice: Subject to any disclaimer, the term of this patent is extended or adjusted under 35 U.S.C. 154(b) by 433 days.

(21) Appl. No.: 09/935,964

(22) Filed: Aug. 23, 2001

(65) Prior Publication Data

US 2002/0047843 A1 Apr. 25, 2002

(30) Foreign Application Priority Data

Aug. 31, 2000 (JP) ........................... 2000-263773

(51) Int. Cl.$^7$ .............................................. G06T 17/00
(52) U.S. Cl. .................. 345/426; 345/420; 345/660
(58) Field of Search ................... 345/420, 421, 345/422, 426, 927, 660, 643, 620

(56) References Cited

U.S. PATENT DOCUMENTS

| | | | | |
|---|---|---|---|---|
| 4,819,192 A | * | 4/1989 | Kuragano et al. | 345/421 |
| 5,043,922 A | * | 8/1991 | Matsumoto | 345/422 |
| 5,422,986 A | | 6/1995 | Neely | |
| 5,870,098 A | | 2/1999 | Gardiner | |
| 6,356,264 B1 | * | 3/2002 | Yasui et al. | 345/426 |
| 6,384,822 B1 | * | 5/2002 | Bilodeau et al. | 345/422 |

FOREIGN PATENT DOCUMENTS

| | | |
|---|---|---|
| EP | 0916374 | 5/1999 |
| EP | 0948978 | 10/1999 |
| JP | 11-025286 | 1/1999 |
| JP | 11-175752 | 7/1999 |
| JP | 11-306384 | 11/1999 |
| JP | 2000-076479 | 3/2000 |
| JP | 2001-307128 | 11/2001 |
| JP | 2002-024854 | 1/2002 |
| JP | 2002-042161 | 2/2002 |

OTHER PUBLICATIONS

Watt et al., "Advanced Animation and Rendering Techniques Theory and Practice", 1992, Addison–Wesley, pp. 3–9, 155–166.*
Crow, "Shadow Algorithms for Computer Graphics", Siggraph 1977.*
Atherton et al., "Polygon Shadow Generation".*
Chrysanthou et al., "Shadow Volume BSP Trees for Computation of Shadows in Dynamic Scenes", 1995, ACM.*
"Computer Graphics" Foley, J.D., et al., Addison–Wesley, Oct. 23, 1990, pp. 745–753.
"A General Version of Crow's Shadow Volumes" Bergeron, P., IEEE Computer Graphics and Applications, IEEE Inc. New York, vol. 6, No. 9, Sep. 1, 1986, pp. 17–28.
A print of a screen of http://www.opengl.org/developers/code/mjktips/rts/.
A print of a screen of http://cat.zero.ad.jp/~zak54165/Tech-Memo/RegidBodyMemo/RegidBodyMemo01.htm#StencilBuf.

* cited by examiner

*Primary Examiner*—Almis R Jankus
(74) *Attorney, Agent, or Firm*—Jordan and Hamburg LLP

(57) ABSTRACT

Vertices of a polygon model M0 are sorted into those on which rays are projected (visible-surface vertices M01) and those on which rays are not projected (hidden-surface vertices M02) based on normal vectors V2 of the vertices of the polygon model M0 and a light source vector V1, and shadow models (shadow volumes) M1, M2, M3 are generated by moving the hidden-surface vertices in a direction of the light source vector V1. Shadow images can be easily created by applying stenciling to these shadow models.

11 Claims, 8 Drawing Sheets

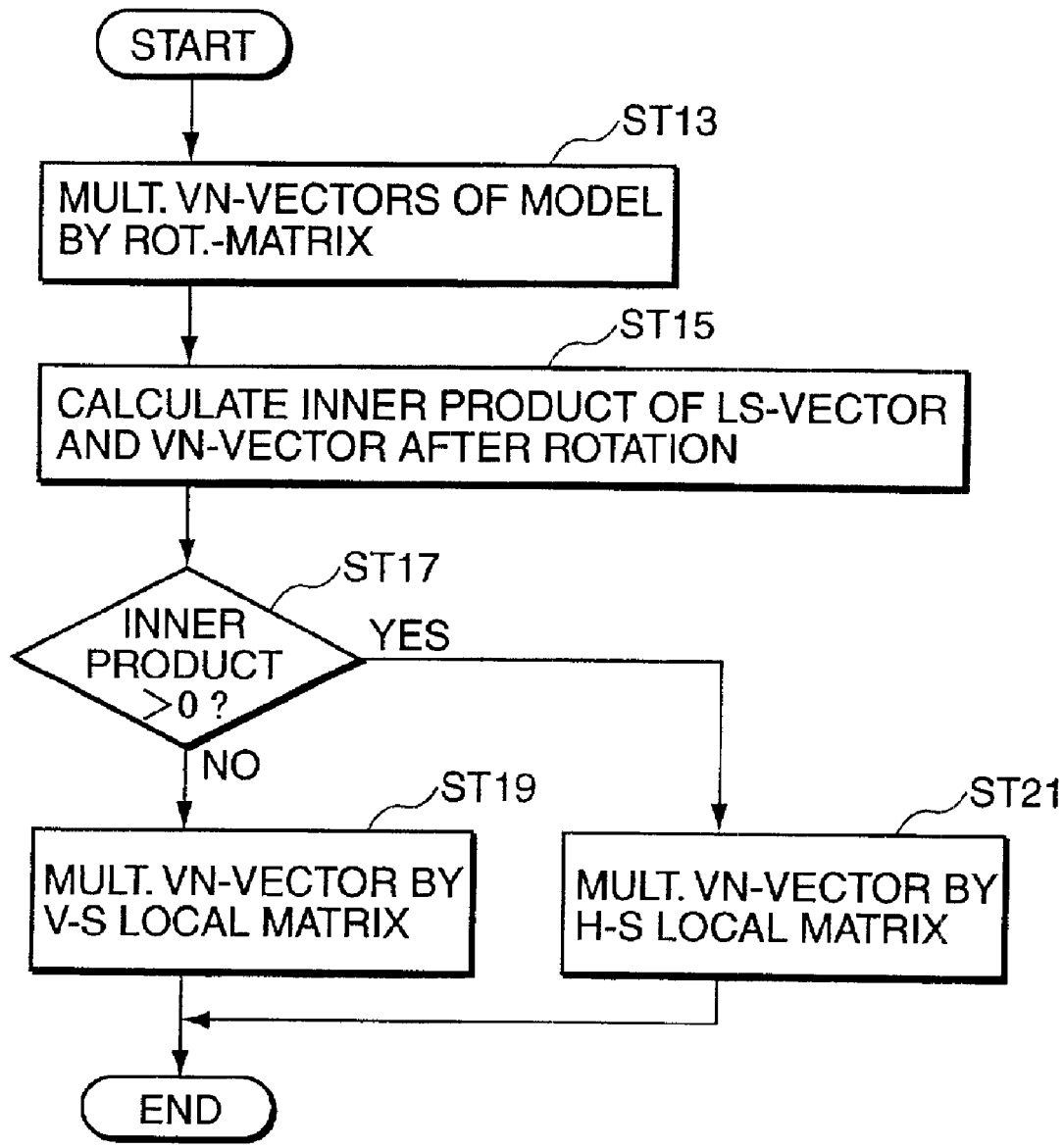

HIDDEN SURFACE      VISIBLE SURFACE

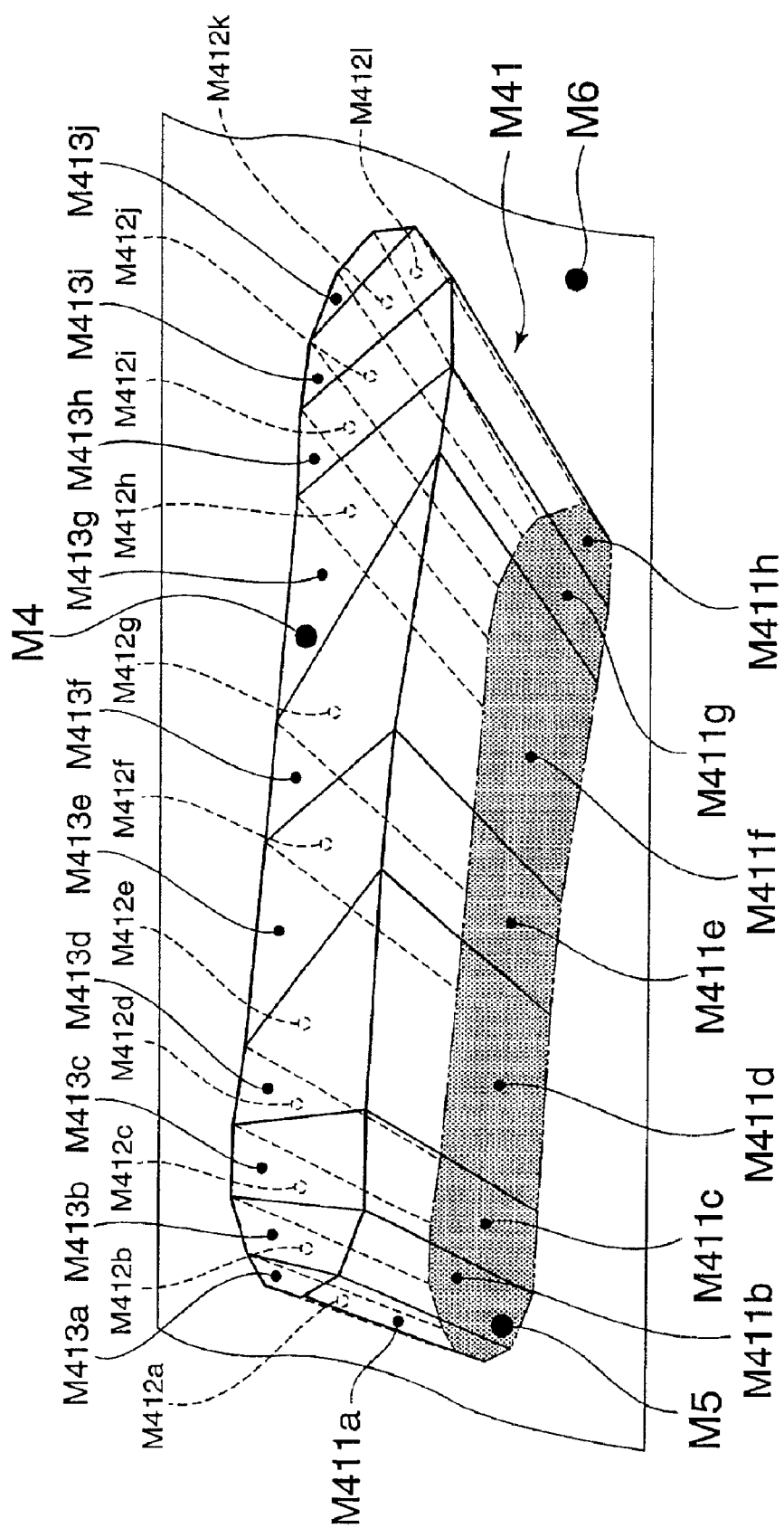

THREE-DIMENSIONAL IMAGE PROCESSING METHOD AND APPARATUS, READABLE STORAGE MEDIUM STORING THREE-DIMENSIONAL IMAGE PROCESSING PROGRAM AND VIDEO GAME SYSTEM

The present invention relates to a three-dimensional (3D) image processing technique of applying a specified image processing to display a model located in a simulated three-dimensional (3D) space on a monitor after rendering it, which technique is applied, for example, to video game systems.

BACKGROUND OF THE INVENTION AND RELATED ART STATEMENT

In recent years, various game systems in which characters are displayed in a simulated 3D space generated on a monitor screen have been spread. Some of such game systems are known to simulate skiing, surfing, motor-booting, snow boarding, skate boarding, etc.

Further, in order to make games more interesting as compared to those played in game systems which simulate running, sliding or like action on surfaces such as the ground surface and sea surface, there have been considered such simulated game systems that a character is caused to float from the ground surface, sea surface or other surface in a simulated 3D space on a monitor surface based on the undulation of the ground surface, sea surface or other surface and the running (or sliding) speed of the character. Typical games played in such game systems are snowboard games and half pipe games in which jumps are essential elements.

If a shadow of the character is thrown onto the ground surface, sea surface or other surface in such game systems in which the character is caused to float or jump in the simulated 3D space, a better presence can be given, thereby realizing game systems which can offer games having a variety of interesting and ingenious aspects.

SUMMARY OF THE INVENTION

In view of the above situation, an object of the present invention is to provide image processing method and apparatus for realistically and easily creating shadows of characters, a readable storage medium storing a 3D image processing program and a video game system.

In order to achieve the above object, the present invention is related to a three-dimensional image processing apparatus for generating a shadow model of a solid model formed by polygons each having vertex normal vectors. Said three-dimensional image processing apparatus comprises a vertex sorting unit for sorting the respective vertices of the polygons forming the solid model into visible-surface vertices facing in a direction toward a light source and hidden-surface vertices facing in a direction opposite from the light source, and shadow model generating unit for deforming the solid model by moving the hidden-surface vertices in a propagating direction of rays from the light source. According to this construction, the shadow model can be easily generated using the model data of the polygon model for which a shadow is to be created.

These and other objects, features and advantages of the present invention will become more apparent upon a reading of the following detailed description and accompanying drawings.

BRIEF DESCRIPTION OF THE DRAWINGS

FIG. 4 is a flow chart showing a shadow model generating procedure, FIGS. 5A to 5D are diagrams showing shadow models of a spherical model as examples, wherein FIG. 5A shows the spherical model for which shadow models are to be generated, FIG. 5B shows a shadow model in the case that hidden-surface vertices are not moved to extend or reduce their distances from a center of the spherical model, FIG. 5C shows an exemplary shadow model in the case that hidden surface vertices are moved to reduce their distances from the center of the spherical model and FIG. 5D shows an exemplary shadow model in the case that the hidden surface vertices are moved to extend their distances from the center of the spherical model, FIGS. 7 and 8 are diagrams showing a shadow image of a snowboard thrown upon the surface of a slope which image is generated by applying stenciling to the shadow model, wherein FIG. 7 shows the shadow model of the snowboard and FIG. 8 shows a shadow of the snowboard thrown upon the surface of the slope and the shadow model clipped by the surface of the slope.

DETAILED DESCRIPTION OF THE PREFERRED EMBODIMENTS OF THE PRESENT INVENTION

Figure 1:
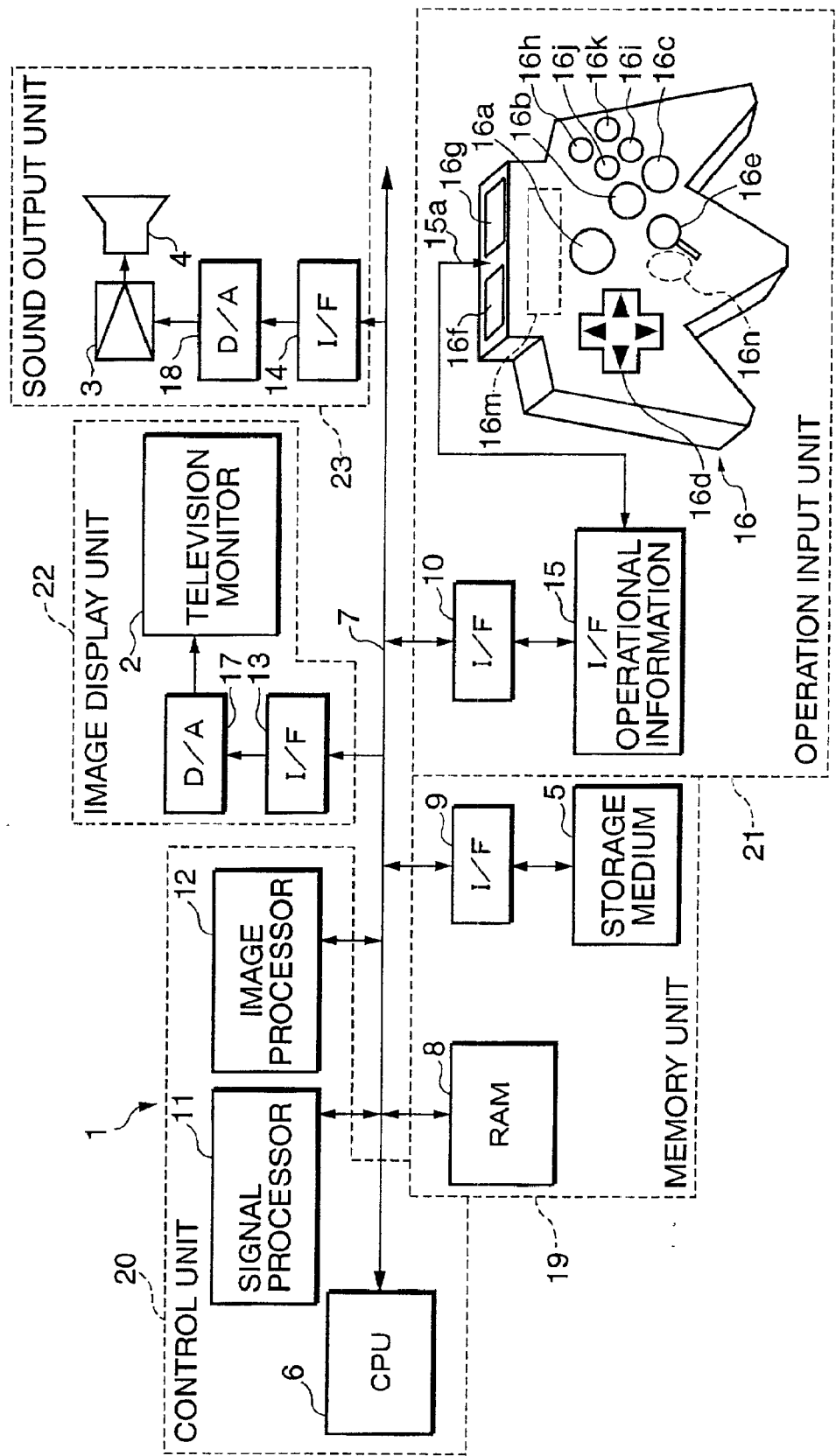
FIG. 1 is a block diagram showing one embodiment of a video game system according to the present invention.

FIG. 1 is a block diagram showing one embodiment of a video game system according to the present invention. This game system 1 is provided with a main game unit, a television (TV) monitor 2 for displaying images of a game, an amplifying circuit 3 and a loudspeaker 4 for outputting sound effects and the like during a game, and a storage medium 5 storing game data including image data, sound data and program data. The storage medium 5 may be a ROM cassette in which a ROM storing the game data and a program data of an operating system is contained in a plastic casing, an optical disk, and a flexible disk. Depending on the mode of the game system 1, a built-in type ROM or the like may be used.

The main game unit is constructed such that buses 7 including address busses, data buses and control buses are connected with a CPU 6; a RAM 8, interface circuits 9, 10, a signal processor 11, an image processor 12, and interface circuits 13, 14 are connected with the buses 7; a controller 16 is connected with the interface circuit 10 via an operational information interface circuit 15; a digital-to-analog (D/A) converter 17 is connected with the interface circuit 13; and a D/A converter 18 is connected with the interface circuit 14.

A memory unit 19 is constructed by the RAM 8, the interface circuit 9 and the storage medium 5; a control unit 20 for controlling the progress of the game is constructed by the CPU 6, the signal processor 11 and the image processor 12; an operation input unit 21 is constructed by the interface circuit 10, the operational information interface circuit 15 and the controller 16; an image display unit 22 is constructed by the TV monitor 2, the interface circuit 13 and the D/A converter 17; and a sound output unit 23 is constructed by the amplifying circuit 3, the loudspeaker 4, the interface circuit 14 and the D/A converter 18.

The signal processor 11 mainly performs calculation of positions of characters in a simulated 3D space, calculation to transform a position in the simulated 3D space to the one in a two-dimensional (2D) space, light source calculation, and reading and combination of various sound data.

The image processor 12 positions polygons forming an image to be formed in a display area of the RAM 8 and applies rendering such as texture mapping to these polygons based on the calculation result of the signal processor 11.

The controller 16 is provided with various buttons for selecting game contents, instructing the start of the game, and instructing actions, direction, etc. to a main character.

The mode of the game system 1 differs depending on its application. Specifically, the TV monitor 2, the amplifying circuit 3 and the loudspeaker 4 are separate from the main game unit in the case that the game system 1 is constructed for home use, whereas all the elements shown in FIG. 1 are contained as a unit in one casing in the case that the game system 1 is constructed for business use.

In the case that the game system 1 is constructed with a personal computer or a workstation as a core, the TV monitor 2 corresponds to a computer display, the image processor 12 corresponds to part of the game program data stored in the storage medium 5 or hardware on an extension board mounted on an extension slot of the computer, and the interface circuits 9, 10, 13, 14, the D/A converters 17, 18, and the operational information interface circuit 15 correspond to hardware on the extension board mounted on the extension slot of the computer. Further, the RAM 8 corresponds to a main memory of the computer or the respective areas of an extension memory.

A case where the game system 1 is constructed for home use is described below. First, the operation of the game system 1 is briefly described. When a power switch (not shown) is turned on to activate the video game system 1, the CPU 6 reads image data, sound data and game program data from the storage medium 5 in accordance with the operating system stored in the storage medium 5. All or part of the read image data, sound data and game program data are stored in the RAM 8.

Thereafter, the game is proceeded by the CPU 6 in accordance with the game program data stored in the RAM 8 and contents of instructions given by a game player via the controller 16. In other words, commands as tasks for forming images and outputting sounds are suitably generated in accordance with contents of instructions given by the game player via the controller 16.

The signal processor 11 performs calculation of positions of characters in the 3D space (of course the same applies for the 2D space), a light source calculation, reading and combination of various sound data in accordance with these commands.

Subsequently, the image processor 12 writes the image data to be formed in the display area of the RAM 8 based on the calculation result of the signal processor 11. The image data written in the RAM 8 is supplied via the interface circuit 13 to the D/A converter 17, which then supplies the image data to the TV monitor 2 to display it as an image on the screen of the TV monitor 2 after converting it into an analog video signal.

On the other hand, the sound data outputted from the signal processor 11 is supplied via the interface circuit 14 to the D/A converter 18, which in turn converts it into an analog sound signal (via a filter or the like). The converted signal is outputted as a game sound from the loudspeaker 4 as a sound generating means via the amplifying circuit 3.

The game sounds refer to BGMs, various sound effects, presentation sounds, voices, etc.

Figure 2:
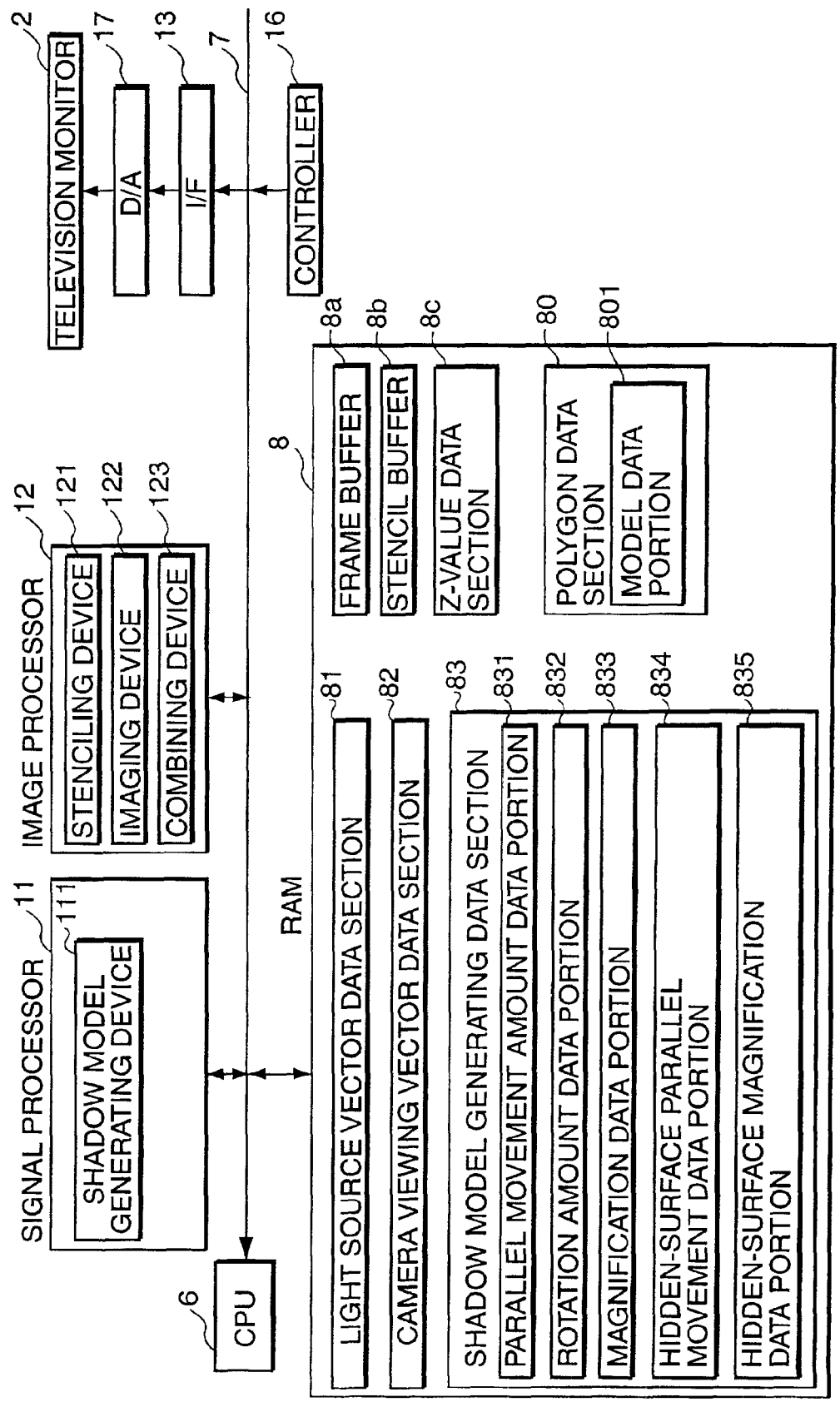
FIG. 2 is a block diagram showing an essential portion of a 3D image processing apparatus.

FIG. 2 is a block diagram showing an essential portion of a 3D image processing apparatus. The RAM 8 is provided with a polygon data section 80 for storing coordinates of vertices of the respective polygons, normal vectors of the respective vertices, normal vectors of surfaces of the polygons, and like data, a light source vector data section 81 for storing data on a vector representing a propagating direction of rays from a light source, a camera viewing vector data section 82 for storing data on a vector representing a viewing direction of a virtual camera, a shadow model generating data section 83 for storing data used to generate shadow models (shadow volumes), a frame buffer 8a for storing an image obtained by applying rendering to a polygon model located in the simulated 3D space, a stencil buffer 8b for storing a shadow image obtained by applying stenciling to the shadow model, and a Z-value data section 8c for storing distances Z between the viewpoint of the virtual camera and the polygons corresponding to the respective pixels in the simulated 3D space. Here, it is assumed that the normal vectors of the respective vertices and surfaces of the polygons, the light source vector, and the viewing vector of the camera are all normalized.

The polygon data section 80 includes a model data portion 801 for storing data on models for which shadow models are to be generated. The shadow model generating data section 83 includes a parallel movement amount data portion 831 representing an amount by which the model for which a shadow model is to be generated is moved in parallel to a display position to locate this model in the simulated 3D space, a rotation amount data portion 832 representing an amount of rotation of the model, a magnification data portion 833 representing a magnification (enlargement/reduction) of the model, a hidden-surface parallel movement data portion 834 representing how much a set of vertices of the respective polygons (here, referred to as "hidden-surface vertices." Contrary to this, a set of vertices of the polygons upon which rays from the light source are projected are referred to as "visible-surface vertices") upon which rays from the light source are not projected should be moved in parallel in a direction of the light source vector, and a hidden-surface magnification data portion 835 representing how much hidden-surface vertices are magnified based on the center of the model.

The signal processor 11 includes a shadow model generating device 111 for generating shadow models in a procedure to be described later. The image processor 12 includes a stenciling device 121 for generating a shadow image from the shadow model in a procedure called stenciling, an imaging device 122 for writing an image obtained by applying rendering to a polygon model located in the simulated 3D space in the frame buffer 8a and writing a shadow image in the stencil buffer 8b, and a combining device 123 for reading and combining the image written in the frame buffer 8a and the one written in the stencil buffer 8b and writing a combined image in the frame buffer 8a.

Figure 3:
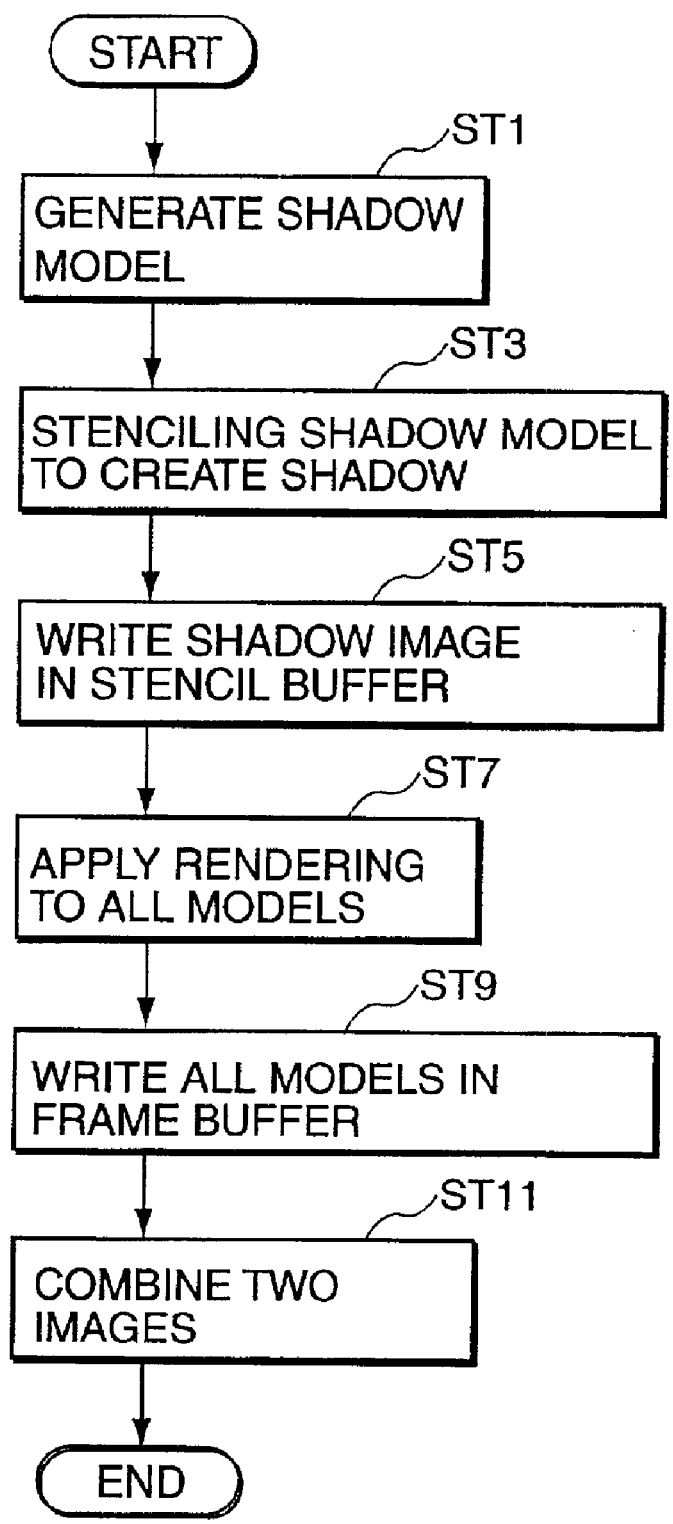
FIG. 3 is a flow chart showing a summary of a 3D image processing applied to display a shadow of a specific polygon model on a monitor.

FIG. 3 is a flow chart showing a summary of a 3D image processing applied to display a polygon model located in the simulated 3D space on the monitor 2 after applying rendering to it and to display a shadow of a specific polygon model on the monitor.

First, a shadow model of a polygon model desired to be displayed with a shadow is generated by the shadow model generating device 111 (Step ST1). Then, stenciling is applied to the shadow model by the stenciling device 121 to generate a shadow image (Step ST3). The generated shadow image is written in the stencil buffer 8b by the imaging device 122 (Step ST5). Subsequently, rendering is applied to all polygon models except the shadow model located in the simulated 3D space to obtain an image of the entire model except the shadow model (Step ST7). This image of the entire model except the shadow model is written in the frame buffer 8a by the imaging device 122 (Step ST9). The image written in the frame buffer 8a and the one written in the stencil buffer 8b are read and combined by the combining device 123 and the combined image is written in the frame buffer 8a (Step ST1).

A polygon model used in the following description has vertex normal vector data corresponding to the respective vertices of the polygons forming the model and surface normal vector data corresponding to the respective surfaces of the polygons forming the model.

Here, a method for transforming coordinates of the vertices of the model which method is used to locate the polygon model in the simulated 3D space and to generate the shadow model is described. Coordinate transform of the respective vertices of the polygon is specified by a magnification, a rotation amount and a parallel movement amount of the model. In other words, an operation shown in Equation (1) is carried out in order to transform initial coordinates of a specific vertex from (x,y,z) to n(x',y',z').

$$\begin{bmatrix} x' \\ y' \\ z' \\ 1 \end{bmatrix} = Mat \cdot \begin{bmatrix} x \\ y \\ z \\ 1 \end{bmatrix} \quad (1)$$

Here, Mat is a 4×4 matrix. In the case that the model is magnified by Bx in X-axis direction, By in Y-axis direction and Bz in Z-axis direction, SMat (magnification matrix) shown in Equation (2) may be used as Mat of Equation (1).

$$SMat = \begin{bmatrix} Bx & 0 & 0 & 0 \\ 0 & By & 0 & 0 \\ 0 & 0 & Bz & 0 \\ 0 & 0 & 0 & 1 \end{bmatrix} \quad (2)$$

Further, in the case that the model is rotated by Rx (radian) in X-axis direction, Ry (radian) in Y-axis direction and Rz (radian) in Z-axis direction, RMat (rotation matrix) shown in Equation (3) may be used as Mat of Equation (1).

$$RMat = \begin{bmatrix} Cp*Ch & Cp*Sh & -Sp & 0 \\ Sr*Sp*Ch-Cr*Sh & Sr*Sp*Sh+Cr*Ch & Sr*Cp & 0 \\ Cr*Sp*Ch+Sr*Sh & Cr*Sp*Sh-Sr*Ch & Cr*Sp & 0 \\ 0 & 0 & 0 & 1 \end{bmatrix} \quad (3)$$

Here,
Sr=sin(Rx), Cr=cos(Rx),
Sp=sin(Ry), Cp=cos(Ry),
Sh=sin(Rz), Ch=cos(Rz).

It is necessary to similarly rotate the normal vectors of the vertices (or surfaces) of the polygons in the case of rotating the model. Further, in the case that the model is moved in parallel by Tx in X-axis direction, Ty in Y-axis direction and Tz (radian) in Z-axis direction, TMat (parallel movement matrix) shown in Equation (4) may be used as Mat of Equation (1).

$$TMat = \begin{bmatrix} 1 & 0 & 0 & 0 \\ 0 & 1 & 0 & 0 \\ 0 & 0 & 1 & 0 \\ Tx & Ty & Tz & 1 \end{bmatrix} \quad (4)$$

In the case that the above three kinds of transforms are simultaneously carried out, TRSMat shown in Equation (5) which is a product of TMat, RMat and SMat may be used as Mat of Equation (1).

$$TRSMat = TMat \cdot RMat \cdot Smat = \begin{bmatrix} Bx*(Cp*Ch) & Bx*(Cp*Sh) & -Bx*Sp & 0 \\ By*(Sr*Sp*Ch-Cr*Sh) & By*(Sr*Sp*Sh+Cr*Ch) & By*Sr*Cp & 0 \\ Bz*(Cr*Sp*Ch+Sr*Sh) & Bz*(Cr*Sp*Sh-Sr*Ch) & Bz*Cr*Cp & 0 \\ Tx & Ty & Tz & 1 \end{bmatrix} \quad (5)$$

FIG. 4 is a flow chart showing a procedure of generating the shadow model. Here, a case where the hidden-surface vertices of the shadow model are not moved to enlarge or reduce areas of the hidden surfaces is described. First, vertex normal vectors when the polygon for which the shadow is to be created is located in the simulated 3D space are obtained by multiplying the vertex normal vectors of this polygon by the rotation matrix (Step ST13).

Subsequently, an inner product of the vertex normal vector obtained in Step ST13 and the light source vector is calculated for each vertex of the polygon model for which the shadow is to be generated (Step ST15), and it is discriminated whether the obtained inner product is larger than "0" (Step ST17).

If the inner product is smaller than "0", this vertex is a vertex upon which rays from the light source are projected, and the vertex can be located in the simulated 3D space by multiplying the vertex normal vector by the matrix TRSMat (referred to as a visible-surface local matrix) shown in Equation (5) (Step ST19). In other words, the visible-surface vertices are located in the same positions as when the polygon for which a shadow is to be created is located in the simulated 3D space.

On the other hand, if the inner product is larger than "0", this vertex is a vertex upon which no ray from the light source is projected, and the vertex can be located in the simulated 3D space by multiplying the vertex normal vector by the matrix TRSMat' (referred to as a hidden-surface local matrix) shown in Equation (6) (Step ST21)

$$TRSMat' = Tmat' \cdot RMat \cdot SMat = \begin{bmatrix} Bx*(Cp*Ch) & Bx*(Cp*Sh) & -Bx*Sp & 0 \\ By*(Sr*Sp*Ch - Cr*Sh) & By*(Sr*Sp*Sh + Cr*Ch) & By*Sr*Cp & 0 \\ Bz*(Cr*Sp*Ch + Sr*Sh) & Bz*(Cr*Sp*Sh - Sr*Ch) & Bz*Cr*Cp & 0 \\ Tx' & Ty' & Tz' & 1 \end{bmatrix} \quad (6)$$

Here, $Tx'=Tx+k \times Lx$ $Ty'=Ty+k \times Ly$ $Tz'=Tz+k \times Lz$.

where (Lx,Ly,Lz) is a light source vector and k is a constant representing a distance of the hidden-surface vertex along the propagating direction of the rays from the light source which distance is stored in the hidden-surface parallel movement data section 834. In other words, the hidden-surface vertices are located in positions, which are reached by being moved in parallel by the distance k along the propagating direction of the rays from the light source from their positions when the polygon for which a shadow is to be created is located in the simulated 3D space.

The shadow model includes visible-surface vertices located in the simulated 3D space in Step ST20 and hidden-surface vertices located therein in Step ST21.

On the other hand, a matrix TRSMat"0 shown in Equation (7) may be used instead of the matrix TRSMat' used in Step ST21 in the case of moving the hidden-surface vertices to reduce or enlarge the areas of the hidden surfaces.

Figure 5A:
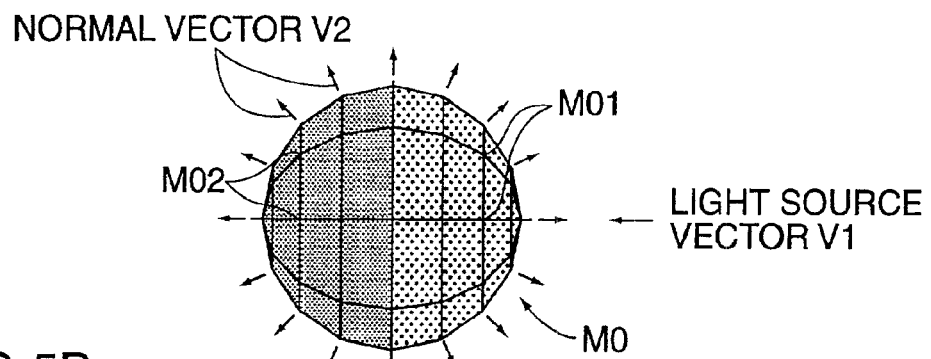
Figure 5B:
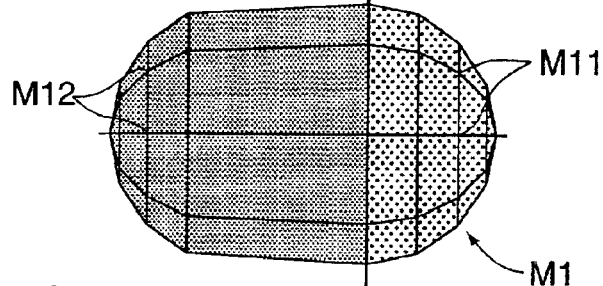

FIG. 5B shows a shadow model M1 in the case that the hidden-surface vertices M02 are not moved to enlarge or reduce the areas of the hidden surfaces. The shadow model M1 is generated by moving the hidden-surface vertices M02 in parallel with the direction of the light source vector V1, i.e. in the negative direction of X-axis. If such a shadow model M1 is used, a shadow of a specified size is created regardless of a distance between a projection surface of the shadow and the model M0 in the simulated 3D space if this distance is equal to or smaller than a specified value. Thus, the shadow model M1 generated only by moving the hidden-surface vertices in parallel are suited to representing a shadow created when rays from the light sources are parallel rays as in this example.

Figure 5C:
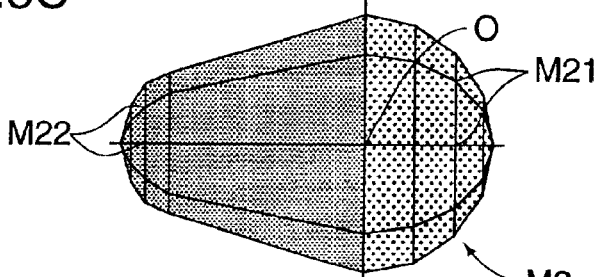

FIG. 5C shows an example of a shadow model M2 in the case that the hidden-surface vertices M02 are moved to reduce the areas of the hidden surfaces. The shadow model M2 is generated by moving the hidden-surface vertices M02 of FIG. 5A in parallel with the direction of the light source vector V1, i.e. in the negative direction of X-axis while reducing the areas of the hidden surfaces along Y-axis and Z-axis with respect to a center o of the polygon M0. If such a shadow model M2 is used, the size of a shadow to be created becomes smaller as a distance between a projection $$TRSMat' = Tmat' \cdot RMat \cdot SMat' = \begin{bmatrix} Bx'*(Cp*Ch) & Bx'*(Cp*Sh) & -Bx'*Sp & 0 \\ By'*(Sr*Sp*Ch - Cr*Sh) & By'*(Sr*Sp*Sh + Cr*Ch) & By'*Sr*Cp & 0 \\ Bz'*(Cr*Sp*Ch + Sr*Sh) & Bz'*(Cr*Sp*Sh - Sr*Ch) & Bz'*Cr*Cp & 0 \\ Tx' & Ty' & Tz' & 1 \end{bmatrix} \quad (7)$$

Here, $Bx'=Bx \times BBx$ $By'=By \times BBy$ $Bz'=Bz \times BBz$ where BBx, BBy, BBz are stored in the hidden-surface magnification data portion 835 and represent magnifications at which the hidden-surface are magnified in X-axis, Y-axis and Z-axis directions, respectively.

FIGS. 5A to 5D are diagrams showing shadow models of a spherical polygon M0 as examples. In FIGS. 5A to 5D, vertices included in sparsely dotted polygons are visible-surface vertices (M01, M11, M21, M31) and remaining vertices are hidden-surface vertices (M02, M12, M22, M32). Coordinate axes are shown next to FIG. 5D.

FIG. 5A shows the spherical polygon model M0 for which a shadow model is to be generated. Parallel rays are incident on the polygon M0 in a direction of a shown light source vector V1, i.e. from right to left (negative direction along X-axis). Normal vectors V2 at the respective vertices are facing radially outward from the center of the spherical polygon M0. It can be seen that if an inner product of the normal vector V2 at the vertex and the light source vector V1 is positive, i.e. an X-component of the normal vector V2 at this vertex is facing in the same direction as the light source vector V1, this vertex is a hidden-surface vertex M02.

surface of the shadow and the model M0 in the simulated 3D space becomes larger if this distance is equal to or smaller than a specified value. Thus, the shadow model M2 generated by distance-reduction and parallel movements of the hidden-surface vertices is suited to representing a shadow created when the light source is a surface light source or a line light source.

Figure 5D:
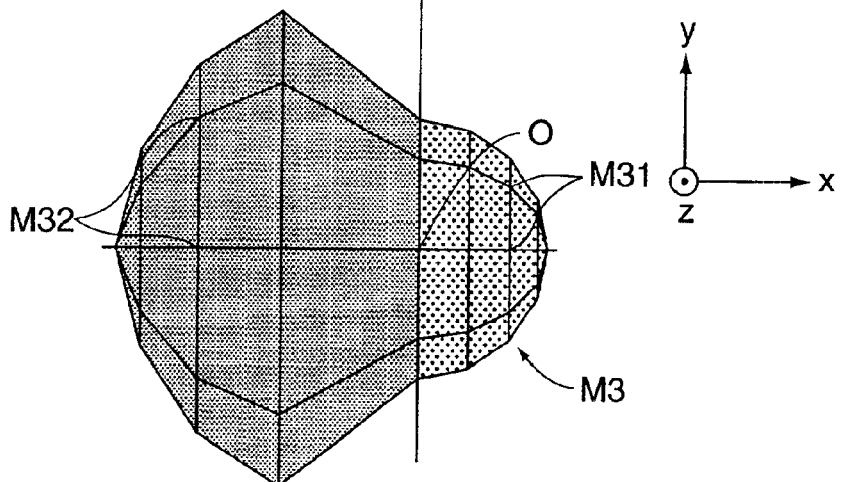

FIG. 5D shows an example of a shadow model M3 in the case that the hidden-surface vertices M02 are moved to enlarge the areas of the hidden surfaces. The shadow model M3 is generated by moving the hidden-surface vertices M02 of FIG. 5A in parallel with the direction of the light source vector V1, i.e. in the negative direction of X-axis while enlarging the areas of the hidden surfaces along Y-axis and Z-axis with respect to the center O of the polygon M0. If such a shadow model M3 is used, the size of a shadow to be created becomes larger as a distance between a projection surface of the shadow and the model M0 in the simulated 3D space becomes larger if this distance is equal to or smaller than a specified value. Thus, the shadow model M3 generated by distance-extension and parallel movements of the hidden-surface vertices is suited to representing a shadow created when the light source is a point light source.

Figure 6:
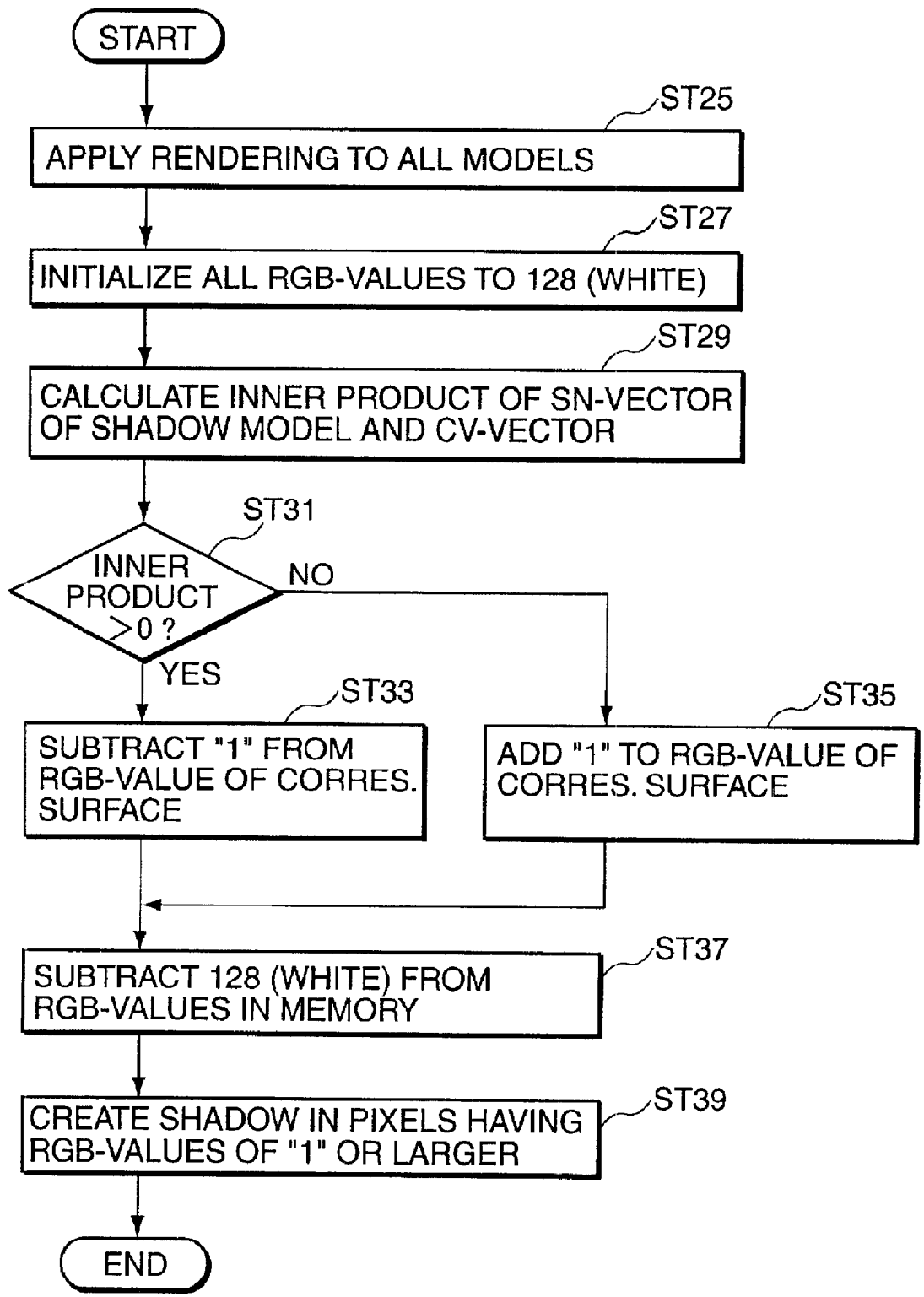
FIG. 6 is a flow chart showing a procedure of generating a shadow image using a shadow model.

FIG. 6 is a flow chart showing a procedure of a processing called stenciling for generating a shadow image using a shadow model. First, rendering is applied by placing all polygon models including the shadow model in the simulated 3D space (Step ST25). By this processing, RGB-values of the models displayed pixel by pixel of the screen are written, for example, in 8 bits (0 to 255) in the stencil buffer 8b. Further, the distances Z from the viewpoint of the virtual camera to the model displayed in the respective pixels are written in the Z-value data section 8c.

Subsequently, all the RGB-values in a memory of the stencil buffer 8b are initialized to 128 (represent white color) (Step ST27). Then, an inner product of the normal vector of each surface of the shadow model and the viewing vector of the camera is calculated (Step ST29) and it is discriminated whether the calculated inner product is larger than "0" (Step ST31).

The surface an inner product larger than "0" is a surface (front-facing polygon) whose normal vector is facing in a direction opposite from the viewpoint of the camera and, for example, "1" is subtracted from the RGB-values of the pixels in the memory of the stencil buffer 8b corresponding to this surface (Step ST33). The surface having an inner product equal to or smaller than "0" is a surface (back-facing polygon) whose normal vector is facing in a direction toward the viewpoint of the camera and "1" is added to the RGB-values of the pixels in the memory of the stencil buffer 8b corresponding to this surface (Step ST35).

Subsequently, 128 is subtracted from all the RGB-values in the memory of the stencil buffer 8b (Step ST37). At this time, if the result of subtraction is a negative value, this negative value is replaced by "0". Then, shadow is created in the pixels whose RGB-values in the memory of the stencil buffer 8b are "1" or larger (Step ST39).

A shadow image is created from the shadow model by the above processing. Although "1" is added or subtracted in the above calculation, any integer between 1 and 127 may be used.

As described above, the pixels in which shadow is created are those having the front-facing polygon and having no back-facing polygon in the same pixel positions. Here, since the shadow model is a polygon model for clipping a closed space, no shadow is created if there is no projection surface of the shadow. The shadow is not created also in the case that the projection surface of the shadow is facing in a direction opposite from the viewpoint of the camera.

Figure 7:
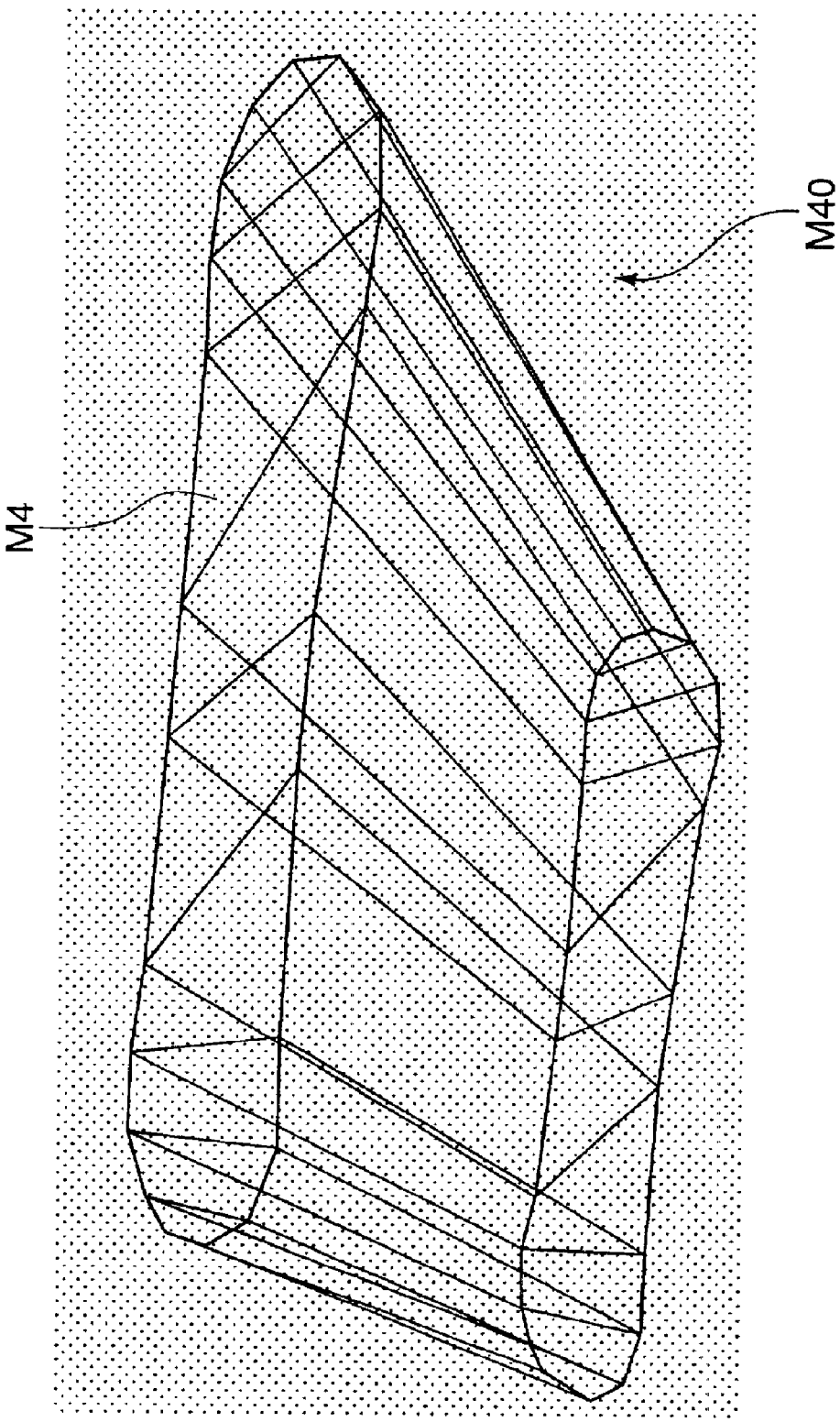

FIGS. 7 and 8 are diagrams showing a shadow image of a snowboard thrown onto the surface of a slope which image is obtained by applying stenciling to a shadow model. FIG. 7 shows a shadow model M40 of a snowboard M4 in the case of moving the hidden-surface vertices to reduce areas of hidden surfaces.

FIG. 8 is a diagram showing a shadow M5 of a snowboard M4 thrown on a surface M6 of a slope and a shadow model M41 clipped by the slope surface M6. It can be seen that the shadow model M41 clipped by the slope surface M6 includes (a) a plurality of front-facing polygons M411, M413 and (b) a plurality of back-facing polygons M412. The plurality of front-facing polygons include those polygons forming a portion of side surface that can be seen from the viewpoint of the camera and a top surface of the shadow model M41 that can be also seen from the viewpoint of the camera. More specifically, the plurality of front-facing polygons include those polygons M411$a$, M411$b$, M411$c$, M411$d$, M411$e$, M411$f$, M411$g$, and M411$h$ and those polygons forming the top surface M413$a$, M413$b$, M413$c$, M413$d$, M413$e$, M413$f$, M413$g$, M413$h$, M413$i$, and M413$j$. The shadow M5 is created by pixels corresponding to those pixels forming front-facing polygons (M411$a$+M411$b$+M411$c$+M411$d$+M411$e$+M411$f$+M411$g$+M411$h$+M413$a$+M413$b$+M413$c$+M413$d$+M413$e$+M413$f$+M413$g$+M413$h$+M413$i$+M413$j$) minus those pixels corresponding to back-facing polygons (M412$a$+M412$b$+M412$c$+M412$d$+M412$e$+M412$f$+M412$g$+M412$h$+M412$i$+M412$j$+M412$k$+M412$l$). In other words, Shadow M5=Summation of pixels corresponding to polygons ΣM411 and ΣM413−Summation of pixels corresponding to polygons ΣM412. Where ΣM411 means M411$a$+M411$b$+M411$c$+M411$d$+M411$e$+M411$f$+M411$g$+M411$h$. Where ΣM412 means M412$a$+M412$b$+M412$c$+M412$d$+M412$e$+M412$f$+M412$g$+M412$h$+M412$i$+M412$j$+M412$k$+M412$l$. Where ΣM413 means M413$a$+M413$b$+M413$c$+M413$d$+M413$e$+M413$f$+M413$g$+M413$h$+M413$i$+M413$j$.

The present invention may be embodied as follows.

(A) Although there is only one polygon model for which a shadow is to be created in the foregoing embodiment, shadow images can be generated in the same procedure also in the case that there are two or more polygon models for which shadows are to be created. However, it is necessary to secure an area of the stencil buffer 8b for the number of the polygons for which the shadows are to be created. The more the polygon models for which shadows are to be created, the more realistic images can be made.

(B) Although the polygon for which a shadow is to be created has a surface normal vector and vertex normal vectors in the foregoing embodiment, it may have only either one of them. A capacity of the model data portion 801 can be reduced by adopting at least either one of these vectors. Vectors (surface normal vectors or vertex normal vectors) not possessed by the polygon model for which a shadow is to be created may be calculated by the following method.

The vertex normal vector of the polygon can be calculated by adding and averaging the normal vectors of the surfaces of the polygon model neighboring this vertex. The surface normal vector of the polygon can be calculated by adding and averaging the normal vectors of the respective vertices of the polygon.

(C) Although the vertex an inner product of which normal vector and the light source vector is "0" is judged to be a visible-surface vertex in the foregoing embodiment, it may be judged to be a hidden-surface vertex. In this embodiment, the number of the vertices judged to be hidden-surface vertices is increased, with the result that a shadow model having a different shape is generated. Further, shadow models of various shapes can be generated by changing the directions of the vertex normal vectors of the polygon model for which a shadow is to be displayed.

(D) Although the hidden-surface vertices are moved to enlarge or reduce the areas of the hidden surfaces with respect to the center of the model in the case of generating the shadow model in the foregoing embodiment, they may be moved so with respect to any arbitrary point such as a point located away from the center of the model by a specified distance toward the light source. Further, although the magnification of the hidden surfaces is set at a common value for all hidden-surface vertices in the foregoing embodiment, magnification may be so set as to enlarge some hidden surfaces while reducing the others. Furthermore, although the hidden-surface vertices are moved by magnification and parallel movements in generating the shadow model in the foregoing embodiment, a method may be adopted according to which coordinates are set for each hidden-surface vertex in the simulated 3D space. In these embodiments, a desired shadow image can be obtained if magnification conditions such as the reference point, the magnification and the coordinates of the vertices are determined according to a state of a surface upon which a shadow is to be thrown.

(E) Although the model data and other data are stored in the RAM 8 in the foregoing embodiment, they may be transferred from the storage medium 5 to the RAM 8 according to the progress of the game. This embodiment has an advantage that a necessary capacity of the RAM 8 can be reduced.

(F) Although the RGB-values are expressed in 8 bits in the foregoing embodiment, they may be expressed in a desired number of bits. The more bits, the more delicate color tones can be expressed.

In sum, the present invention relates to a three-dimensional image processing apparatus for generating a shadow model of a solid model formed by polygons each having vertex normal vectors. The 3D image processing apparatus comprises vertex sorting means for sorting the respective vertices of the polygons forming the solid model into visible-surface vertices facing in a direction toward a light source and hidden-surface vertices facing in a direction opposite from the light source, and shadow model generating means for deforming the solid model by moving the hidden-surface vertices in a propagating direction of rays from the light source. According to this construction, the shadow model can be easily generated using the model data of the polygon model for which a shadow is to be created.

The vertex sorting means may be configured to sort the vertices into the visible-surface vertices and the hidden-surface vertices based on whether an inner product of a normal vector of each vertex of each polygon and a light source vector representing the propagating direction of the rays from the light source is a positive or negative value. According to this construction, the visible-surface vertices and the hidden-surface vertices can be easily sorted out by calculating the inner products of the vectors.

The shadow model generating means may be configured to move specified vertices in parallel with the propagating direction of the rays from the light source. According to this construction, shadows of a specific size are created regardless of a change in distance by which the characters of the models for which the shadows are created float from the ground surface, sea surface or other surface. Since such shadows behave in a manner similar to those actually created when the light source is a light source for emitting parallel rays such as sun rays, realistic and powerful images can be formed.

The shadow model generating means may be configured to narrow distances between the specified vertices such that the hidden-surface vertices of the shadow model having the visible-surface vertices define a shape tapered in a moving direction. According to this construction, shadows thrown upon the ground surface, sea surface or other surface become smaller as the distances by which the characters of the models for which the shadows are created float from the ground surface, sea surface or other surface increase. Since such shadows behave in a manner similar to those actually created when the light source is a bar-shaped light source or a surface light source, realistic and powerful images can be formed.

The shadow model generating means may be configured to widen distances between the specified vertices such that the hidden-surface vertices of the shadow model having the visible-surface vertices define a shape swollen in a moving direction. According to this construction, shadows thrown upon the ground surface, sea surface or other surface become larger as the distances by which the characters of the models for which the shadows are created float from the ground surface, sea surface or other surface increase. Since such shadows behave in a manner similar to those actually created when the light source is a point light source, realistic and powerful images can be formed.

The aforementioned 3D image processing apparatus may further comprise a shadow creating means for sorting the polygons forming the shadow model into front-facing polygons facing in a direction toward a viewpoint of a virtual camera and back-facing polygons facing in a direction opposite from the viewpoint of the virtual camera, and creating a shadow image in pixels which are pixels corresponding to the front-facing polygons minus pixels corresponding to the back-facing polygons. According to this construction, a shadow can be easily created by applying a technique called stenciling to the shadow model.

The aforementioned 3D image processing apparatus may further comprises a shadow creating means for creating a shadow image of the solid model using the shadow model, a first storage means for storing the created shadow image of the solid model, a second storage means for applying rendering to the polygon models except the shadow model and storing the thus created image, and a combining means for reading and combining the image stored in the first storage means and the one stored in the second storage means. According to this construction, the shadow model can be easily generated using the model data of the polygon model for which a shadow is to be created, and this shadow can be realistically and easily created. Further, an entire image including the shadow of the solid model can be obtained by combining the shadow image of the solid model stored in the first storage means and the image other than the shadow image stored in the second storage means.

The solid model may be a character movable in height direction in a simulated 3D space. According to this construction, since a shadow is created to follow a movement of the character along height direction, the movement of the character can be expressed in the realistic and powerful images.

Another form of the present invention relates to a readable storage medium storing a 3D image processing program for generating a shadow model of a solid model formed by polygons each having vertex normal vectors, the program comprising the steps of: vertex sorting processing for sorting the respective vertices of the polygons forming the solid model into visible-surface vertices facing in a direction toward a light source and hidden-surface vertices facing in a direction opposite from the light source, and shadow model generating processing for deforming the solid model by moving the hidden-surface vertices in a propagating direction of rays from the light source. According to this program, the shadow model can be easily generated using the model data of the polygon model for which a shadow is to be created.

The vertex sorting processing may be performed to sort the vertices into the visible-surface vertices and the hidden-surface vertices based on whether an inner product of a normal vector of each vertex of each polygon and a light source vector representing the propagating direction of the rays from the light source is a positive or negative value. According to this program, the visible-surface vertices and the hidden-surface vertices can be easily sorted out by calculating the inner products of the vectors.

The shadow model generating processing may be performed to move specified vertices in parallel with the propagating direction of the rays from the light source. According to this program, shadows of a specific size are created regardless of a change in distance by which the characters of the models for which the shadows are created float from the ground surface, sea surface or other surface.

Since such shadows behave in a manner similar to those actually created when the light source is a light source for emitting parallel rays such as sun rays, realistic and powerful images can be formed.

The shadow model generating processing may be performed to narrow distances between the specified vertices such that the hidden-surface vertices of the shadow model having the visible-surface vertices define a shape tapered in a moving direction. According to this program, shadows thrown upon the ground surface, sea surface or other surface become smaller as the distances by which the characters of the models for which the shadows are created float from the ground surface, sea surface or other surface increase. Since such shadows behave in a manner similar to those actually created when the light source is a bar-shaped light source or a surface light source, realistic and powerful images can be formed.

The shadow model generating processing may be performed to widen distances between the specified vertices such that the hidden-surface vertices of the shadow model having the visible-surface vertices define a shape swollen in a moving direction. According to this program, shadows thrown upon the ground surface, sea surface or other surface become larger as the distances by which the characters of the models for which the shadows are created float from the ground surface, sea surface or other surface increase. Since such shadows behave in a manner similar to those actually created when the light source is a point light source, realistic and powerful images can be formed.

The program may further comprise a step of shadow creating processing for sorting the polygons forming the shadow model into front-facing polygons facing in a direction toward a viewpoint of a virtual camera and back-facing polygons facing in a direction opposite from the viewpoint of the virtual camera, and creating a shadow image in pixels which are pixels corresponding to the front-facing polygons minus pixels corresponding to the back-facing polygons. With this readable storage medium, a shadow can be easily created by applying a technique called stenciling to the shadow model.

The program may further comprise the steps of shadow creating processing for creating a shadow image of the solid model using the shadow model, and a combining processing for storing the created shadow image of the solid model and an image created by applying rendering to the polygon models except the shadow model, and reading and combining the two stored images. With this readable storage, the shadow model can be easily generated using the model data of the polygon model for which a shadow is to be created, and this shadow can be realistically and easily created. Further, an entire image describing the shadow of the solid model can be obtained by combining the shadow image of the solid model stored in the first storage means and the image other than the shadow image stored in the second storage means.

In the aforementioned readable program, the solid model may be a character movable in height direction in the simulated 3D space. With this readable storage medium, since a shadow is created to follow a movement of the character along height direction, the movement of the character can be expressed in the realistic and powerful images.

Furthermore, another form of the present invention relates to a 3D image processing method for generating a shadow model of a solid model formed by polygons each having vertex normal vectors. The method comprises the steps of: sorting the respective vertices of the polygons forming the solid model into visible-surface vertices facing in a direction toward a light source and hidden-surface vertices facing in a direction opposite from the light source, and deforming the solid model by moving the hidden-surface vertices in a propagating direction of rays from the light source.

According to this method, the shadow model can be easily generated using the model data of the polygon model for which a shadow is to be created.

Moreover, another form of the present invention relates to a video game system, which comprises any one of the aforementioned 3D image processing apparatus, an image display means for displaying images, a program storage means storing a game program data, and an externally operable operation means, wherein the 3D image processing apparatus displays images on the image display means in accordance with the game program data. The video game system having such a construction can realistically and easily create shadow images.

This application is based on Japanese patent application serial no. 2000-263773 filed in Japanese Patent Office on Aug. 31, 2000, the contents of which are hereby incorporated by reference.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. A readable storage medium storing a three-dimensional image processing program for a video game system that has an image display means for displaying images and storage means for storing game program data to generate a shadow model of a solid model formed by polygons each having vertex normal vectors, the program comprising the steps of:

vertex sorting processing for sorting respective vertices of the polygons forming the solid model into visible-surface vertices facing in a direction toward a light source and hidden-surface vertices facing in a direction opposite from the light source, said solid model being a character movable in a height direction in a simulated 3D space such that the character as a whole rises above and leaves a ground surface in the simulated 3D space;

storing in memory unit magnification rates at which the hidden-surface verticles are magnified in the 3D space; and shadow model generating processing for deforming the solid model by moving the hidden-surface vertices in a propagating direction of rays from the light source and magnifying the hidden-surface verticles at said rates stored in the memory unit to produce a deformed shadow on the ground surface having a distorted shape of the character when the character as a whole rises above and leaves the ground surface.

2. A readable storage medium according to claim 1, wherein the vertex sorting processing is performed to sort the vertices into the visible-surface vertices and the hidden-surface vertices based on whether an inner product of a normal vector of each vertex of each polygon and a light source vector representing the propagating direction of the rays from the light source is a positive or a negative value.

3. A readable storage medium according to claim 1, wherein the shadow model generating processing is performed to move specified vertices in parallel with the propagating direction of the rays from the light source.

4. A readable storage medium according to claim 1, wherein the shadow model generating processing is performed to narrow distances between specified vertices such that the hidden-surface vertices of the shadow model having the visible-surface vertices define a shape tapered in a moving direction.

5. A readable storage medium according to claim 1, wherein the shadow model generating processing is performed to widen distances between specified vertices such that the hidden-surface vertices of the shadow model having the visible-surface vertices define a shape swollen in a moving direction.

6. A readable storage medium according to claim 1, wherein the program further comprises a shadow creating processing for sorting the polygons forming the shadow model into front-facing polygons facing in a direction toward a viewpoint of a virtual camera and back-facing polygons facing in a direction opposite from the viewpoint of the virtual camera, and creating a shadow image in pixels which are pixels corresponding to the front-facing polygons minus pixels corresponding to the back-facing polygons.

7. A readable storage medium according to claim 1, wherein the program further comprises a shadow creating processing for creating a shadow image of the solid model using the shadow model, and a combining processing for storing the created shadow image of the solid model and an image created by applying rendering to the polygon models except the shadow model, and reading and combining the two stored images.

8. A three-dimensional image processing method for a video game system that has an image display means for displaying images and storage means for storing game program data to generate a shadow model of a solid model formed by polygons each having vertex normal vectors, said method comprising the steps of:

sorting the respective vertices of the polygons forming the solid model into visible-surface vertices facing in a direction toward a light source and hidden-surface vertices facing in a direction opposite from the light source, said solid model being a character movable in a height direction in a simulated 3D space such that the character as a whole rises above and leaves a ground surface in the simulated 3D space;

storing in a memory unit magnification rates at which the hidden-surface verticles are magnified in the 3D space; and deforming the solid model by moving the hidden-surface vertices in a propagating direction of rays from the light source and magnifying the hidden-surface vertices at said rates stored in the memory unit to produce a deformed shadow on the ground surface having a distorted shape of the character when the character as a whole rises above and leaves the ground surface.

9. A video game system comprising:

a three-dimensional image processing apparatus for generating a shadow model of a solid model formed by polygons each having vertex normal vectors, said 3D image processing apparatus including;

vertex sorting means for sorting respective vertices of the polygons forming the solid model into visible-surface vertices facing in a direction toward a light source and hidden-surface vertices facing in a direction opposite from the light source;

said solid model being a character movable in a height direction in a simulated 3D space such that the character as a whole rises above and leaves a ground surface in the simulated 3D space;

a memory unit including a shadow model generating section having a hidden-surface surface magnification data portion which stores magnification rates at which the hidden-surface vertices are magnified in 3D space; and shadow model generating means for deforming the solid model by moving the hidden-surface vertices in a propagating direction of rays from the light source and magnifying the hidden-surface vertices at said rates stored in the memory unit to produce a deformed shadow on the ground surface having a distorted shape of the character when the character as a whole rises above and leaves the ground surface; and image display means for displaying images;

program storage means for storing a game program data;

externally operable operation means, and wherein the three-dimensional image processing apparatus displays images on the image display means in accordance with the game program data.

10. The video game system according to claim 9, wherein said shadow model generating section includes a hidden-surface parallel movement data portion which stores data indicating a degree of movement of the hidden-surface vertices in parallel in the propagating direction of the rays from the light source.

11. The video game system according to claim 9, where in said hidden-surface magnification data portion stores the magnification rates in X-axis, Y-axis, and Z-axis, respectively, at which the hidden-surface vertices are magnified in said X, Y, and Z axis in the 3D space.

* * * * *